US011714733B2

(12) United States Patent
Zhou et al.

(10) Patent No.: US 11,714,733 B2
(45) Date of Patent: *Aug. 1, 2023

(54) METHOD AND APPARATUS, AND READABLE STORAGE MEDIUM (71) Applicant: Huawei Technologies Co., Ltd., Shenzhen (CN)

(72) Inventors: Jianhua Zhou, Chengdu (CN); Meng Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/545,203

(22) Filed: Dec. 8, 2021

(65) Prior Publication Data

US 2022/0100623 A1 Mar. 31, 2022

Related U.S. Application Data (63) Continuation of application No. 16/824,259, filed on Mar. 19, 2020, now Pat. No. 11,237,929, which is a continuation of application No. PCT/CN2018/104288, filed on Sep. 6, 2018.

(30) Foreign Application Priority Data

Sep. 22, 2017 (CN) .......................... 201710868918.1

(51) Int. Cl.
*G06F 11/20* (2006.01)
(52) U.S. Cl.
CPC ...... *G06F 11/2094* (2013.01); *G06F 2201/82* (2013.01)

(58) Field of Classification Search
CPC .................. G06F 11/2094; G06F 2201/82
USPC ................. 714/6.22, 6.32, 44, 6.13
See application file for complete search history.

(56) References Cited

U.S. PATENT DOCUMENTS

| 5,978,291 | A | 11/1999 | Kirihata |
| 7,603,530 | B1 | 10/2009 | Liikanen et al. |
| 2007/0067665 | A1* | 3/2007 | Hashemi ............... G06F 3/0605 714/E11.034 |
| 2010/0077252 | A1 | 3/2010 | Siewert et al. |
| 2011/0197024 | A1 | 8/2011 | Thomas |
| 2012/0151254 | A1 | 6/2012 | Horn |
| 2012/0290868 | A1 | 11/2012 | Gladwin et al. |

(Continued)

FOREIGN PATENT DOCUMENTS

| CN | 101609420 A | 12/2009 |
| CN | 102902602 A | 1/2013 |

(Continued)

*Primary Examiner* — Chae M Ko
(74) *Attorney, Agent, or Firm* — Conley Rose, P.C.

(57) ABSTRACT

A redundant array of independent disks (RAID) management method includes, when detecting that a component in a storage medium fails, recovering, based on a RAID policy, data stored in the failed component, saving the recovered data into a pre-defined redundant space of the RAID, and mapping an address of the failed component with the address of the redundant space, converting, according to the mapping, an address of to-be-accessed data comprised in an accessing request into an address within the redundant space, and accessing the to-be-accessed data from the redundant space according to the address within the redundant space.

20 Claims, 3 Drawing Sheets (56) References Cited

U.S. PATENT DOCUMENTS

| | | |
|---|---|---|
| 2013/0073895 A1 | 3/2013 | Cohen |
| 2013/0166991 A1 | 6/2013 | Shimada |
| 2013/0173955 A1 | 7/2013 | Hallak et al. |
| 2014/0157085 A1 | 6/2014 | Shalvi et al. |
| 2014/0189282 A1* | 7/2014 | Gu .................. G06F 12/023 |
| | | 711/171 |
| 2014/0298087 A1 | 10/2014 | Li |
| 2015/0193154 A1 | 7/2015 | Gong et al. |
| 2017/0269862 A1 | 9/2017 | Agombar et al. |
| 2018/0107546 A1 | 4/2018 | Huang et al. |
| 2018/0165169 A1 | 6/2018 | Camp et al. |
| 2018/0246664 A1* | 8/2018 | Wu .................... G06F 3/0679 |
| 2018/0341554 A1 | 11/2018 | Emami et al. |

FOREIGN PATENT DOCUMENTS

| | | | |
|---|---|---|---|
| CN | 103488547 A | 1/2014 | |
| CN | 104662518 A | 5/2015 | |
| CN | 105843557 A | 8/2016 | |
| CN | 106681865 A | 5/2017 | |
| CN | 107766180 A | 3/2018 | |
| CN | 109558333 A * | 4/2019 | |
| DE | 112016005869 T5 * | 9/2018 | .......... G06F 11/1658 |
| EP | 2026188 A2 | 2/2009 | |
| JP | 2008171540 A * | 7/2008 | ............. G11C 29/02 |
| TW | 493176 B * | 7/2002 | |
| WO | 2013075519 A1 | 5/2013 | |
| WO | 2017054756 A1 | 4/2017 | |

\* cited by examiner

METHOD AND APPARATUS, AND READABLE STORAGE MEDIUM

CROSS-REFERENCE TO RELATED APPLICATIONS

This application is a continuation of U.S. patent application Ser. No. 16/824,259 filed on Mar. 19, 2020, which is a continuation of International Patent Application No. PCT/CN2018/104288 filed on Sep. 6, 2018, which claims priority to Chinese Patent Application No. 201710868918.1 filed on Sep. 22, 2017. All of the aforementioned applications are hereby incorporated by reference in their entireties.

TECHNICAL FIELD

This application relates to the field of data storage technologies, and in particular, to a storage medium management method and apparatus, and a readable storage medium.

BACKGROUND

As data storage technologies rapidly develop, storage systems are widely applied. A storage system usually includes a chassis, a power supply, a storage medium, and the like. The storage medium, as a carrier for storing data, is an indispensable part of the storage system. Currently, the storage medium may include a hard disk, a compact disc, and the like. Further, the hard disk may be a solid state disk (SSD), a hard disk drive (HDDs), or the like.

In an embodiment scenario, some storage media usually have a specific life cycle, and if the storage media fail in the life cycle, the storage media need to be managed and maintained. In a related technology, usually, the storage media need to be managed and maintained manually. A hard disk is used as an example. The hard disk, as a field replaceable unit (FRU), can support on-site removal and replacement. Therefore, when the hard disk fails, the storage system usually generates an alarm prompt. In this case, skilled personnel may remove and replace the damaged hard disk in the storage system, thereby managing the storage medium.

In a process of implementing this application, the related technology has at least the following problems. In the storage medium management method provided above, when the hard disk fails, a manual operation is required, resulting in relatively low management efficiency.

SUMMARY

This application provides a storage medium management method and apparatus, and a readable storage medium, to resolve a problem of relatively low management efficiency in other approaches. The technical solutions are as follows.

According to a first aspect, a storage medium management method is provided. The method is applied to a storage system, and the method includes, when detecting that a component in a storage medium fails, recovering, based on a specified redundant array of independent disks (RAID) policy, data stored in the failed component, and saving recovered data into redundant space of the storage medium, and mapping an address of the failed component into the redundant space, to manage the storage medium, where the redundant space is preconfigured or is configured after a maintenance-free rate, a maintenance-free period, an annualized failure rate (AFR) of the storage medium, and a total quantity of components included in the storage medium are determined, the maintenance-free rate and the maintenance-free period are carried in a configuration instruction for the storage medium or obtained by querying a user-defined register, and the AFR is obtained by querying or carried in the configuration instruction.

In this embodiment of this application, the redundant space used to store data after failure recovery is preconfigured based on the maintenance-free rate, the maintenance-free period, the AFR of the storage medium, and the total quantity of components included in the storage medium. Therefore, even if a component in the storage medium fails, data in the failed component may be transferred to the redundant space for storage. In this way, a user does not need to manually replace the component, and maintenance-free management can be implemented on the storage medium in a specified period using the redundant space, thereby improving management efficiency.

Optionally, before the saving recovered data into redundant space of the storage medium, and mapping an address of the failed component into the redundant space, the method further includes receiving the configuration instruction for the storage medium, where the configuration instruction carries the maintenance-free rate and the maintenance-free period, determining, based on the maintenance-free rate, the maintenance-free period, the AFR of the storage medium, and the total quantity of components included in the storage medium, a capacity of the redundant space required to reach a maintenance-free status in the maintenance-free period, and configuring the redundant space of the capacity based on the storage medium.

In the foregoing, before the recovered data is saved into the redundant space of the storage medium, and the address of the failed component is mapped into the redundant space, the redundant space is configured based on the configuration instruction in order to perform maintenance-free management based on the redundant space when a component fails later.

Optionally, the configuring the redundant space of the capacity based on the storage medium includes determining a percentage of the capacity of the redundant space in a total capacity of the storage medium, obtaining, by division from each component included in the storage medium, a physical storage unit in a size of the percentage of the component, and determining all obtained physical storage units as the redundant space of the capacity.

In the foregoing, when the redundant space is configured based on the storage medium, the redundant space may be allocated in each component based on the specific percentage, thereby improving configuration flexibility.

Optionally, the configuration instruction further carries a query instruction, and the query instruction is used to instruct to query for at least one of a maximum maintenance-free capability, a maintenance-free status, a maintenance-free configuration parameter, a maintenance-free determining result, an available capacity, maintenance-free time, and mean time between failures (MTBF) of the storage medium.

In an embodiment, for a maintenance-free storage system that has been configured before, a configured maintenance-free parameter and the like may be queried for using the maintenance-free status. Further, it may further be determined, based on the found maintenance-free parameter, whether current configuration can succeed, thereby ensuring implementation reliability.

Optionally, after the configuring the redundant space of the capacity based on the storage medium, the method further includes reconfiguring a RAID policy based on a remaining storage medium after the redundant space configuration, and determining the reconfigured RAID policy as the specified RAID policy.

In the foregoing, after the redundant space is successfully configured, the RAID policy is reconfigured such that when a component of the storage medium fails later, data in the failed component can be recovered based on the reconfigured RAID policy, thereby ensuring reliability of management on the storage medium.

Optionally, before the recovering, based on a specified RAID policy, data stored in the failed component, the method further includes querying whether a current remaining capacity of the redundant space is larger than or equal to a size of the data stored in the failed component, and if the current remaining capacity of the redundant space is larger than or equal to the size of the data stored in the failed component, performing the operation of recovering, based on a specified RAID policy, data stored in the failed component, or if the current remaining capacity of the redundant space is smaller than the size of the data stored in the failed component, determining a difference between the current remaining capacity of the redundant space and the size of the data stored in the failed component, and configuring, from over-provisioning (OP) space of the storage system, a physical storage unit in a size of the difference as the redundant space.

In the foregoing, before the data stored in the failed component is recovered based on the specified RAID policy, whether the current remaining capacity of the configured redundant space is sufficient to store the data stored in the failed component is queried such that the storage system can determine, based on an actual situation, whether a part of space needs to be borrowed from the OP space of the storage system to serve as hot backup redundancy. In this way, even if the current remaining capacity of the redundant space is insufficient to store the data stored in the failed component, it is still ensured that the storage medium can be maintenance-free. In this way, reliability of data storage is improved.

According to a second aspect, a storage medium management apparatus is provided. The apparatus is configured in a storage system, and the apparatus includes a recovery module configured to, when detecting that a component in a storage medium fails, recover, based on a specified RAID policy, data stored in the failed component, and a storage module configured to save recovered data into redundant space of the storage medium, and map an address of the failed component into the redundant space, to manage the storage medium, where the redundant space is fixedly preconfigured or is configured after a maintenance-free rate, a maintenance-free period, an AFR of the storage medium, and a total quantity of components included in the storage medium are determined, the maintenance-free rate and the maintenance-free period are carried in a configuration instruction for the storage medium or obtained by querying a user-defined register, and the AFR is obtained by querying or carried in the configuration instruction.

Optionally, the apparatus further includes a receiving module configured to receive the configuration instruction for the storage medium, where the configuration instruction carries the maintenance-free rate and the maintenance-free period, a first determining module configured to determine, based on the maintenance-free rate, the maintenance-free period, the AFR of the storage medium, and the total quantity of components included in the storage medium, a capacity of the redundant space required to reach a maintenance-free status in the maintenance-free period, and a first configuration module configured to configure the redundant space of the capacity based on the storage medium.

Optionally, the first configuration module is configured to determine a percentage of the capacity of the redundant space in a total capacity of the storage medium, obtain, by division from each component included in the storage medium, a physical storage unit in a size of the percentage of the component, and determine all obtained physical storage units as the redundant space of the capacity.

Optionally, the configuration instruction further carries a query instruction, and the query instruction is used to instruct to query for at least one of a maximum maintenance-free capability, a maintenance-free status, a maintenance-free configuration parameter, a maintenance-free determining result, an available capacity, maintenance-free time, and MTBF of the storage medium.

Optionally, the apparatus further includes a second configuration module configured to reconfigure a RAID policy based on a remaining storage medium after the redundant space configuration, and a second determining module configured to determine the reconfigured RAID policy as the specified RAID policy.

Optionally, the apparatus further includes a query module configured to query whether a current remaining capacity of the redundant space is larger than or equal to a size of the data stored in the failed component, a trigger module configured to, when the current remaining capacity of the redundant space is larger than or equal to the size of the data stored in the failed component, trigger the recovery module to perform the operation of recovering, based on a specified RAID policy, data stored in the failed component, and a third configuration module configured to, when the current remaining capacity of the redundant space is smaller than the size of the data stored in the failed component, determine a difference between the current remaining capacity of the redundant space and the size of the data stored in the failed component, and configure, from OP space of the storage system, a physical storage unit in a size of the difference as the redundant space.

According to a third aspect, a storage medium management apparatus is provided. A structure of the storage medium management apparatus includes a processor and a memory. The memory is configured to store a program used to support the storage medium management apparatus in performing the storage medium management method provided in the first aspect, and store data related to implementation of the storage medium management method provided in the first aspect. The processor is configured to execute the program stored in the memory. The storage device management apparatus may further include a communications bus, and the communications bus is configured to establish a connection between the processor and the memory.

According to a fourth aspect, a computer readable storage medium is provided. The computer readable storage medium stores an instruction. When the instruction is run on a computer, the computer is enabled to perform the storage medium management method in the first aspect.

According to a fifth aspect, a computer program product that includes an instruction is provided. When the computer program product is run on a computer, the computer is enabled to perform the storage medium management method in the first aspect.

Technical effects achieved in the second aspect, the third aspect, the fourth aspect, and the fifth aspect are similar to technical effects achieved using corresponding technical means in the first aspect. Details are not described herein again.

Beneficial effects brought by the technical solutions provided in this application are as follows. The redundant space used to store data after failure recovery is fixedly preconfigured or is configured based on the maintenance-free rate, the maintenance-free period, the AFR of the storage medium, and the total quantity of components included in the storage medium. Therefore, even if a component in the storage medium fails, data in the failed component may be transferred to the redundant space for storage. In this way, a user does not need to manually replace the component, and maintenance-free management can be implemented on the storage medium using the redundant space, thereby improving management efficiency.

DESCRIPTION OF EMBODIMENTS

To make the objectives, technical solutions, and advantages of this application clearer, the following further describes the implementations of this application in detail with reference to the accompanying drawings.

Before the embodiments of this application are described in detail, terms, an application scenario, and a system architecture in the embodiments of this application are first briefly described.

First, the terms in the embodiments of this application are briefly described.

Redundant space is mainly used to store data after failure recovery, and may also be referred to as hot backup redundancy in an embodiment. In other words, when a component in a storage medium fails, data stored in the component may be recovered and then transferred to the redundant space in order to implement data storage using the redundant space.

A maintenance-free rate is a probability that redundant space is not all damaged. For example, if a storage medium includes n components, and there are k redundant components, the maintenance-free rate is a probability that k or less than k failures occur in the n components. Generally, in this field, the maintenance-free rate has several requirements such as three nines or five nines. The three nines indicate that a probability that a storage medium needs to be maintained is less than 1‰. In an embodiment, less than one device needs to be maintained in five years. The five nines indicate that a probability that a storage medium needs to be maintained is less than 0.001%. For example, if the maintenance-free rate is 99.999128%, it indicates that a requirement of the maintenance-free rate of five nines needs to be met.

A maintenance-free period is a period in which a storage medium does not need to be maintained. For example, if the maintenance-free period is 3, it indicates that the storage medium does not need to be maintained in three years.

MTBF is an indicator used to measure reliability of a device, and is average working time between two consecutive failures. For example, MTBF of a RAID is usually not shorter than 50,000 hours, and typical MTBF of an SSD is 1.5 million hours or 2 million hours.

An AFR is a probability that a device fails in one year. The AFR corresponds to the foregoing MTBF. For example, if the MTBF of the SSD is 1.5 million hours or 2 million hours, a corresponding AFR is 0.584% or 0.438% respectively.

For RAID policies, currently, a RAID 5 policy and a RAID 6 policy are more commonly used. In the following, an example of configuring a 22+1 RAID 5 policy is used for description. It is assumed that an SSD includes 23 disks. In this case, it is equivalent to that one disk is configured to store check data, and the check data is used to recover data in a failed disk in the SSD. In addition, the 22+1 RAID 5 policy supports data recovery when only one disk fails. If two or more disks fail, data recovery cannot be performed.

OP space, is space over-provisioned by a storage system for use by the storage system but unavailable to a user. In other words, the OP space is usually not used to store user data. For example, the OP space may be used for system garbage collection and the like.

Next, the application scenario in the embodiments of this application is briefly described.

In a process of storing data using a storage medium, even in a life cycle of the storage medium, a component in the storage medium may be damaged due to some unavoidable factors. Currently, when a component is damaged, the damaged component usually needs to be manually removed and replaced. In this case, not only network deployment costs and operation and maintenance costs are increased, but also management efficiency of the storage medium is relatively low. Therefore, this application provides a storage medium management method. In the method, proper redundant space is obtained by division from a storage medium in a storage system, and the redundant space is used such that when a component in the storage medium is damaged in a maintenance-free period, manual replacement can be avoided. In other words, a maintenance-free effect can be achieved in the maintenance-free period. In this case, not only network deployment costs and operation and maintenance costs are reduced, and user experience is improved, but also management efficiency of the storage medium is improved. For a specific implementation of the storage medium management method, refer to the embodiment shown in FIG. 2.

Last, the system architecture in the embodiments of this application is briefly described.

The storage medium management method provided in this application may be performed by a storage system. Further, the storage system is configured in a host. It should be noted that, in addition to a storage medium, the storage system usually further includes a chassis, a power supply, a fan, a battery backup unit (BBU), an interface card, a control module, and the like.

In an embodiment, the storage medium may be a hard disk unit, a floppy disk, or the like. Further, the hard disk unit may include one or more hard disks. Because the hard disk SSD has high performance and high reliability, the SSD is widely applied in storage systems. Therefore, in the embodiment shown in FIG. 2, an example in which the storage medium is an SSD is used for detailed description.

The following briefly describes the SSD. A SSD is usually implemented using an NAND flash. The NAND flash is a non-volatile random access storage medium, and a feature of the NAND flash is that data is not lost after a power outage. The NAND flash is different from a conventional volatile random access storage medium or a conventional volatile memory, and therefore may be used as an external memory.

Currently, there are also a plurality of physical forms of SSDs, including a 2.5-inch size that is the same as a size of an HDD, M.2 of an independent printed circuit board (PCB), a PCB form of a customized feature length, and a ball grid array (BGA) form of an independent single-chip package.

Figure 1:
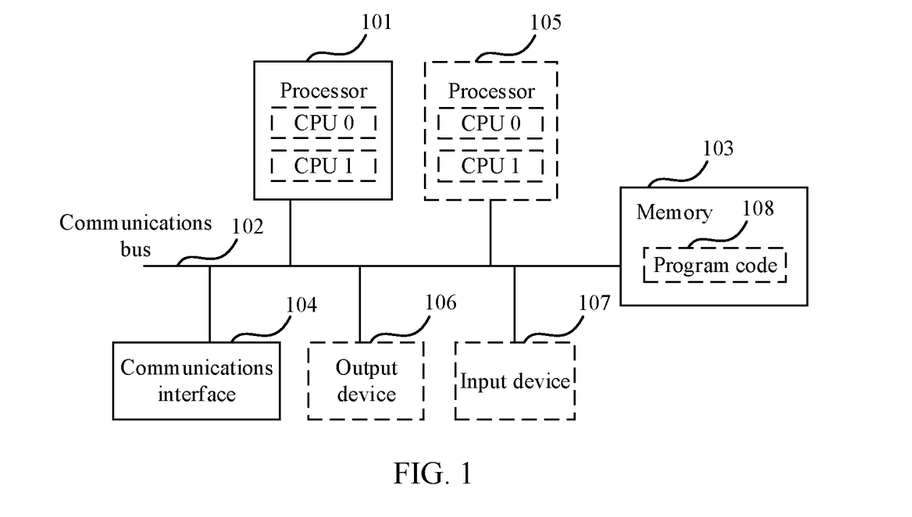
FIG. 1 is a schematic structural diagram of a computer device according to an embodiment of this application.

FIG. 1 is a schematic structural diagram of a computer device according to an embodiment of this application. The foregoing storage system may be implemented using the computer device shown in FIG. 1. Referring to FIG. 1, the computer device includes at least one processor 101, a communications bus 102, a memory 103, and at least one communications interface 104.

The processor 101 may be a general-purpose central processing unit (CPU), a microprocessor, an application-specific integrated circuit (ASIC), or one or more integrated circuits configured to control execution of a program of the solutions in this application.

The communications bus 102 may include a path used to transmit information between the foregoing components.

The memory 103 may be a read-only memory (ROM) or another type of static storage device that can store static information and instructions, a random access memory (RAM) or another type of dynamic storage device that can store information and instructions, or an electrically erasable programmable read-only memory (EEPROM), a compact disc read-only memory (CD-ROM), or another optical disc storage, optical disc storages (including a compact disc, a laser disc, an optical disc, a digital versatile disc (DVD), a BLU-RAY disc, and the like), a magnetic disk storage medium or another magnetic storage device, or any other medium that can be used to carry or store expected program code in a form of an instruction or a data structure and that can be accessed by a computer, but is not limited thereto. The memory 103 may exist alone, and is connected to the processor 101 using the communications bus 102. The memory 103 may alternatively be integrated with the processor 101.

The communications interface 104 uses any apparatus like a transceiver, and is configured to communicate with another device or communications network, such as the Ethernet, a radio access network (RAN), or a wireless local area network (WLAN).

In a specific implementation, in an embodiment, the processor 101 may include one or more CPUs, for example, a CPU 0 and a CPU 1 shown in FIG. 1.

In a specific implementation, in an embodiment, the computer device may include a plurality of processors, for example, the processor 101 and a processor 105 shown in FIG. 1. Each of these processors may be a single-core (single-CPU) processor, or may be a multi-core (multi-CPU) processor. The processor herein may be one or more devices, circuits, and/or processing cores used to process data (such as a computer program instruction).

In a specific implementation, in an embodiment, the computer device may further include an output device 106 and an input device 107. The output device 106 communicates with the processor 101 and may display information in a plurality of manners. For example, the output device 106 may be a liquid crystal display (LCD), a light emitting diode (LED) display device, a cathode ray tube (CRT) display device, or a projector. The input device 107 communicates with the processor 101, and may receive user input in a plurality of manners. For example, the input device 107 may be a mouse, a keyboard, a touch panel device, or a sensing device.

The computer device may be a general-purpose computer device or a dedicated computer device. In a specific implementation, the computer device may be a desktop computer, a portable computer, a network server, a personal digital assistant (PDA), a mobile phone, a tablet computer, a wireless terminal device, a communications device, or an embedded device. A type of the computer device is not limited in this embodiment of this application.

The memory 103 is configured to store program code used to execute the solutions in this application, and the processor 101 controls the execution. The processor 101 is configured to execute program code 108 stored in the memory 103. The program code 108 may include one or more software modules. The storage system may determine, using the processor 101 and the one or more software modules in the program code 108 in the memory 103, the data used for application development.

Figure 2:
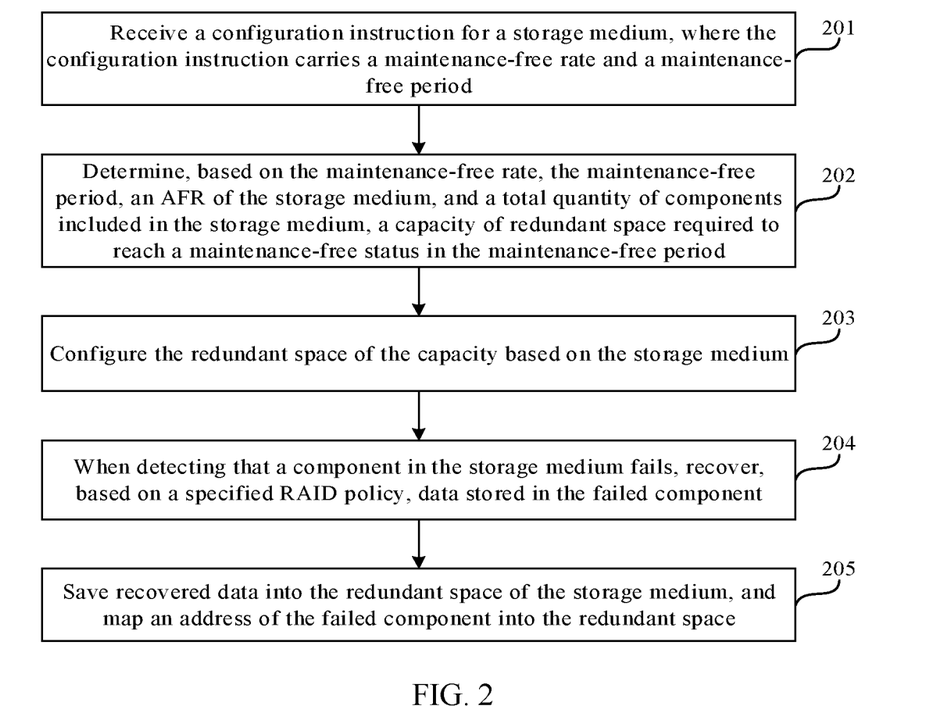
FIG. 2 shows a storage medium management method according to an example embodiment.

The embodiments of this application are described in detail below with reference to FIG. 2. FIG. 2 shows a storage medium management method according to an example embodiment. The storage medium management method is applied to the foregoing storage system. The method may include the following several implementation steps.

Step 201. Receive a configuration instruction for a storage medium, where the configuration instruction carries a maintenance-free rate and a maintenance-free period.

A core of maintenance-free is to use redundant space to prevent components from being all damaged in a life cycle. Therefore, in an embodiment, to enable the storage medium to achieve a maintenance-free effect, a user may configure redundant space of a proper capacity in the storage medium based on an embodiment, to use the redundant space to implement the maintenance-free effect. A specific implementation of configuring the redundant space of the proper capacity is described in step 201 to step 203.

The configuration instruction may be sent by a host to the storage system. Further, the configuration instruction may be sent by the user to the storage system using the host.

In an embodiment, the user may customize the maintenance-free rate and the maintenance-free period based on the actual requirement, and deliver the maintenance-free rate and the maintenance-free period to the storage system using the configuration instruction, to configure or change a maintenance-free parameter of the storage system. If no redundant space is configured in the storage system before, delivering the configuration instruction by the user means instructing the storage system to configure the maintenance-free parameter. If redundant space is configured in the storage system before, delivering the configuration instruction by the user means instructing the storage system to change the maintenance-free parameter.

For example, if the user expects that the storage medium meets a requirement of a maintenance-free rate of 99.999128% in three years, the maintenance-free rate carried in the configuration instruction may be set to 99.999128%, and the maintenance-free period is set to 3.

It should be noted that, in an actual implementation process, a format of the configuration instruction may be in a command form of a standard small computer system interface (SCSI)/a non-volatile memory express (NVMe) standard, or the like, or may be in a user-defined form.

For example, if the format of the configuration instruction is in a command form of the SCSI or the NVMe, the configuration instruction may be specifically Dis_Maintain (Control). Control may further include parameters such as a maintenance-free switch, the maintenance-free rate, and the maintenance-free period.

The maintenance-free switch is used to instruct to enable or disable a maintenance-free function. When the maintenance-free function is enabled, a parameter may be set. For example, maintenance-free parameters such as the maintenance-free rate and the maintenance-free period are set.

Further, the foregoing maintenance-free switch may be defined using DisMaintain_EN. For example, when DisMaintain_EN=10b, it indicates that the maintenance-free function is disabled, and when DisMaintain_EN=01b, it indicates that the maintenance-free function is enabled.

If the maintenance-free parameters need to be changed, a maintenance-free adjustment parameter DisMaintain_Adjust may further be defined. If the maintenance-free parameters need to be adjusted, DisMaintain_Adjust=1 is defined, which means that the maintenance-free parameters are changed to a new maintenance-free rate and a new maintenance-free period.

Further, the foregoing maintenance-free rate may be defined using DisMaintain_Rate, and the maintenance-free period may be defined using DisMaintain_Cycle. For example, if the maintenance-free rate DisMaintain_Rate=05 h and the maintenance-free period DisMaintain_Cycle=03 h, it indicates that a requirement of five nines needs to be met and an objective of three-year maintenance-free period needs to be achieved.

It should be noted that only an example in which the maintenance-free rate and the maintenance-free period are carried in the configuration instruction for the storage medium is used for description in the foregoing. In another implementation, the maintenance-free rate and the maintenance-free period may alternatively be obtained by the storage system by querying a user-defined register. In other words, the maintenance-free rate and the maintenance-free period may be prestored in the register by default. In this case, when receiving the configuration instruction, the storage system queries the register for the maintenance-free rate and the maintenance-free period.

Further, the configuration instruction further carries a query instruction, and the query instruction is used to instruct to query for at least one of a maximum maintenance-free capability, a maintenance-free status, a maintenance-free configuration parameter, a maintenance-free determining result, an available capacity, maintenance-free time, and MTBF of the storage medium.

In this case, a plurality of parameters may be set in the configuration instruction. For example, the configuration instruction may be Dis_Maintain (Control, Status), where Status indicates the query instruction. Further, for a maintenance-free storage system that has been configured before, a configured maintenance-free parameter and the like may be queried for using Status.

The maximum maintenance-free capability refers to a maximum maintenance-free period and a maximum maintenance-free rate that can be supported by the system. In this case, in a possible implementation, if it is determined, by querying, that the maximum maintenance-free capability DisMaintain_Max is a ten-year maintenance-free period, and a maintenance-free rate of eight nines is supported, before the storage system performs the following steps, it may further be determined whether the maintenance-free period and the maintenance-free rate carried in the configuration instruction exceed the maximum maintenance-free capability. If the maintenance-free period and the maintenance-free rate carried in the configuration instruction exceed the maximum maintenance-free capability, that the configuration cannot be performed is indicated, otherwise, the method proceeds to subsequent step 202.

Certainly, it should be noted that, in an embodiment, alternatively, whether the maintenance-free period and the maintenance-free rate carried in the configuration instruction exceed the maximum maintenance-free capability may not be determined. That is, the subsequent step is directly performed.

The maintenance-free status includes an enabled state and a disabled state. Further, in an embodiment, the maintenance-free status may be defined as DisMaintain_Status.

The maintenance-free configuration parameter refers to the maintenance-free rate and the maintenance-free period that have been set previously. Further, the maintenance-free configuration parameter may be defined as DisMaintain_Para.

The maintenance-free determining result includes success and failure. For example, if the configuration succeeds, succeed is displayed, or if the configuration fails (for example, when the specified maintenance-free parameters exceed the maximum maintenance-free capability of the system), failed is displayed. Further, the maintenance-free determining result may be defined as DisMaintain_judge.

The available capacity is a capacity available to the user after the maintenance-free function is enabled. Further, the available capacity may be defined as DisMaintain_Capa.

The maintenance-free time includes a time point for enabling the maintenance-free function and a remaining maintenance-free time period. Further, the maintenance-free time may be defined as DisMaintain_Time.

In the foregoing, a corresponding AFR may be determined by querying for the MTBF of the storage medium. Further, the MTBF of the storage medium may be defined as DisMaintain_MTBF. If DisMaintain_MTBF=2 million hours is obtained by querying, it may be determined that a corresponding AFR is 0.438%.

It should be noted that, only an example in which the query instruction is used to instruct to query for at least one of the maximum maintenance-free capability, the maintenance-free status, the maintenance-free configuration parameter, the maintenance-free determining result, the available capacity, the maintenance-free time, and the MTBF of the storage medium is used for description in the foregoing. In an embodiment, the query instruction may alternatively be used to instruct to query for other information. For example, the query instruction may alternatively be used to instruct to query for the AFR.

In addition, it should further be noted that, only an example in which the configuration instruction carries the query instruction is used for description in the foregoing. In an embodiment, the query instruction may alternatively be carried in a separate command. This is not limited in this embodiment of this application.

Step 202. Determine, based on the maintenance-free rate, the maintenance-free period, the AFR of the storage medium, and a total quantity of components included in the storage medium, a capacity of the redundant space required to reach the maintenance-free status in the maintenance-free period.

Further, the storage system may determine, using the following formula (1) based on the maintenance-free rate, the maintenance-free period, the AFR of the storage medium, and the total quantity of components included in the storage medium, the capacity of the redundant space required to reach the maintenance-free status in the maintenance-free period as follows.

$$\Sigma P\{X=k\}=\Sigma C(n,k)*p^{\wedge}k*(1-p)^{\wedge}(n-k) \qquad (1),$$

where $\Sigma P\{X=k\}$ represents the maintenance-free rate, in other words, represents a probability that k or less than k failures occur in n components, n represents the total quantity of components included in the storage medium, k represents the capacity of the redundant space, p represents a total failure rate, and is determined by the AFR and maintenance-free period, that is, p=AFR*year, and year represents the maintenance-free period.

The AFR may be obtained by querying. A query method of the AFR is described above, and details are not described herein again. Alternatively, the AFR may be carried in the foregoing configuration instruction. In an embodiment, the AFR may alternatively be queried for by the user based on the actually used storage medium, and then entered using the configuration instruction.

It may be learned that the capacity of the redundant space required to reach the maintenance-free status in the maintenance-free period may be determined using the foregoing formula (1).

For example, if the storage medium is an SSD of 25 1-terabyte (TB) units, a physical raw capacity of the SSD is 25 TB. Assuming that system OP space over-provisioned by the system is 7 TB, a physical capacity available to the user is 18 TB. After the maintenance-free status of the SSD is entered (in other words, after the foregoing configuration instruction is received), assuming that the maintenance-free rate carried in the received configuration instruction is five nines and the maintenance-free period is three years, it is determined, by querying, that the AFR is 0.438%. Therefore, it may be determined, using the foregoing formula (1), that the redundant space that needs to be configured is 5 TB. In other words, five spaces of the SSD need to be configured. In this case, the physical capacity available to the user is reduced to 13 TB.

It should be noted that, in this application, the components included in the storage medium are each a storage component applied to an independent failure unit in the system. In an embodiment, the components are independent of each other. If a component is damaged, other components around the component are not affected.

It should be noted that, only an example in which the capacity of the redundant space is determined based on the maintenance-free rate, the maintenance-free period, the AFR of the storage medium, and the total quantity of components included in the storage medium is used for description. In an embodiment, the redundant space may alternatively be fixedly configured. In other words, the capacity of the redundant space is already fixedly preset. In this case, the foregoing calculation process does not need to be performed, and a subsequent configuration operation only needs to be performed based on the fixedly preset capacity.

It should further be noted that, a cost exists for implementing maintenance-free based on redundancy. An increase in component granularity may reduce a redundancy ratio to some extent. If there are more components in the storage medium, the cost for implementing maintenance-free is lower. An example in which the AFR is 0.438% is used. If a hard disk enclosure includes 24 disks, to achieve a three-year maintenance-free effect, it may be determined, through calculation using the foregoing formula (1), that five redundant disks are required. If the total quantity of components increases to 240, to achieve the three-year maintenance-free effect, a quantity of redundant disks is correspondingly reduced to 13. If the total quantity of components increases further, the redundancy ratio also decreases further. The redundancy ratio is a ratio of a quantity of redundant components to the total quantity of components. Therefore, when designing the system (for example, setting the maintenance-free parameters), the user needs to comprehensively measure an input-to-output ratio of redundancy input, maintenance input, spare part input, and the like.

Step 203. Configure the redundant space of the capacity based on the storage medium.

In a possible implementation, a specific implementation of configuring the redundant space of the capacity based on the storage medium may include determining a percentage of the capacity of the redundant space in a total capacity of the storage medium, obtaining, by division from each component included in the storage medium, a physical storage unit in a size of the percentage of the component, and determining all obtained physical storage units as the redundant space of the capacity.

Using the foregoing example as an example, if it is determined that 5-TB redundant space needs to be configured, the storage system may determine that the percentage of the capacity of the redundant space in the total capacity of the storage medium is 5/25. Therefore, for each of the 25 disks included in the SSD, the storage system may obtain, by division from each disk, a physical unit in a size of 5/25 of the disk, and then determine all the obtained physical storage units as the redundant space of the capacity. In this way, the 5-TB redundant space is configured from the storage medium.

Certainly, it should be noted that the specific implementation of configuring the redundant space of the capacity based on the storage medium is only an example. In another embodiment, the step of configuring the redundant space of the capacity based on the storage medium may alternatively be implemented in another manner. For example, in another possible implementation manner, alternatively, 5 TB may be selected from 18 TB available to the user as the redundant space. In other words, five disks are selected from the 18 disks, and the five disks are used as the redundant space. Alternatively, in another possible implementation, the redundant space may be evenly allocated in the 18 disks. This is not limited in this embodiment of this application.

Further, after the redundant space of the capacity is configured based on the storage medium, a RAID policy needs to be reconfigured based on a remaining storage medium after the redundant space configuration, and the reconfigured RAID policy is determined as the specified RAID policy.

After the redundant space is configured in the storage medium, it is equivalent that the physical units of the storage medium are re-divided. Therefore, in this case, the RAID policy needs to be reconfigured. For example, a 21+2 erasure code, RAID 6, or 22+1 RAID 5 is configured such that when a component of the storage medium fails later, data in the failed component can be recovered based on the reconfigured RAID policy.

It should be noted that, in a possible implementation, the reconfigured RAID policy may alternatively be consistent with the original RAID policy. This is not limited in this application.

After the storage system configures the redundant space, when it is detected that a component in the storage medium fails, the redundant space may be used to implement maintenance-free management. For a specific implementation, refer to the following step 204 and step 205.

Step 204. When detecting that a component in the storage medium fails, recover, based on the specified RAID policy, data stored in the failed component.

If it is detected that the component in the storage medium fails, the storage system enables the reconfigured specified RAID policy to recover the data, to prevent data loss. In this case, the damaged component is no longer used.

Further, before the data stored in the failed component is recovered based on the specified RAID policy, whether the configured redundant space is sufficient to store the data in the damaged component may also be queried. If a current remaining capacity of the configured redundant space is sufficient to store the data in the damaged component, the following step 205 is performed. However, if the current remaining capacity of the configured redundant space is insufficient to store the data in the damaged component (for example, a failure rate of the storage medium increases due to some exceptions), a part of space may be borrowed from the storage medium or the OP space of the system to serve as hot backup redundancy, to ensure that the storage medium can still be maintenance-free.

Further, whether the current remaining capacity of the redundant space is larger than or equal to a size of the data stored in the failed component is queried. If the current remaining capacity of the redundant space is larger than or equal to the size of the data stored in the failed component, the following step 205 is performed. If the current remaining capacity of the redundant space is smaller than the size of the data stored in the failed component, a difference between the current remaining capacity of the redundant space and the size of the data stored in the failed component is determined, and a physical storage unit in a size of the difference is configured from the OP space of the storage system as the redundant space. The OP space of the storage system is OP space that is over-provisioned from space of the storage medium for improving performance and reliability of the storage system and that is to be accessed by the system but cannot be accessed by a user.

In an embodiment, if the current remaining capacity of the redundant space is larger than or equal to the size of the data stored in the failed component, it indicates that the current remaining capacity of the configured redundant space is sufficient to store the data in the damaged component. In this case, the following step 205 may be performed. If the current remaining capacity of the redundant space is smaller than the size of the data stored in the failed component, it indicates that the current remaining capacity of the configured redundant space is insufficient to store the data in the damaged component. In this case, because the space available to the user cannot be reduced, a part of space needs to be borrowed from the OP space of the storage system to store the recovered data, and an address of the failed component is mapped into the borrowed part of space.

It should be noted that, only an example in which the part of space is borrowed from the OP space of the storage system to store the recovered data is used for description herein. In an embodiment, if the OP space of the storage system is insufficient, a part of space may alternatively be borrowed from OP space of the storage medium to store the recovered data.

Step 205. Save the recovered data into the redundant space of the storage medium, and map the address of the failed component into the redundant space, to manage the storage medium.

Because the failed component is damaged and cannot be used any more, the recovered data needs to be stored in the redundant space of the storage medium in order to use the redundant space to store the data in the failed component.

In addition, in an actual application scenario, to improve user experience, component damage is usually expected not to be perceived by the user. Therefore, the address of the failed component needs to be mapped into the redundant space. In this way, for the user, data is still written to the original address of the failed component, but actually, the data has been transferred to the redundant space for storage.

For example, it is assumed that the address of the failed component is 0 gigabyte (GB)-200 GB space of disk 1. After the storage system saves the recovered data into the redundant space of the storage medium, the storage system maps, into the redundant space, the address of the failed component, that is, the 0 GB-200 GB space of disk 1. In this way, for a user, data originally planned to be stored in the 0 GB-200 GB space of disk 1 is actually stored in the redundant space instead of the failed component.

It should be noted that, as described above, the redundant space is fixedly preconfigured or is configured after the maintenance-free rate, the maintenance-free period, the AFR of the storage medium, and the total quantity of components included in the storage medium are determined, the maintenance-free rate and the maintenance-free period are carried in the configuration instruction for the storage medium or obtained by querying the user-defined register, and the AFR is obtained by querying or carried in the configuration instruction.

It should be noted that, only an example in which the storage medium management method is applied to the storage system is used for description in the foregoing. In another embodiment, the storage medium management method may alternatively be applied to an all-flash (for example, a solid-state array (SSA) or an all flash array (AFA)) system, a specific implementation principle is similar, and details are not described herein again.

In this embodiment of this application, the redundant space used to store data after failure recovery is fixedly preconfigured or is configured based on the maintenance-free rate, the maintenance-free period, the AFR of the storage medium, and the total quantity of components included in the storage medium. Therefore, even if a component in the storage medium fails, data in the failed component may be transferred to the redundant space for storage. In this way, a user does not need to manually replace the component, and maintenance-free management can be implemented on the storage medium using the redundant space, thereby improving management efficiency.

Figure 3A:
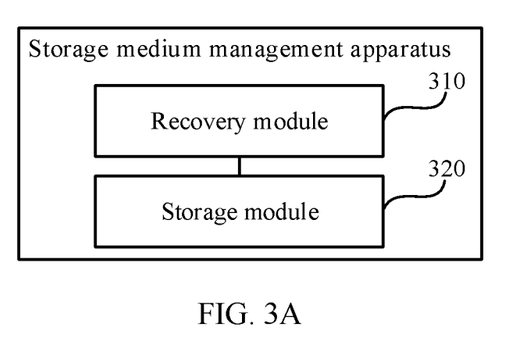
FIG. 3A shows a storage medium management apparatus according to an example embodiment.

FIG. 3A shows a storage medium management apparatus according to an example embodiment. The storage medium management apparatus may be implemented using software, hardware, or a combination thereof. The apparatus includes a recovery module 310 configured to perform step 204 in the embodiment shown in FIG. 2, and a storage module 320 configured to perform step 205 in the embodiment shown in FIG. 2.

Figure 3B:
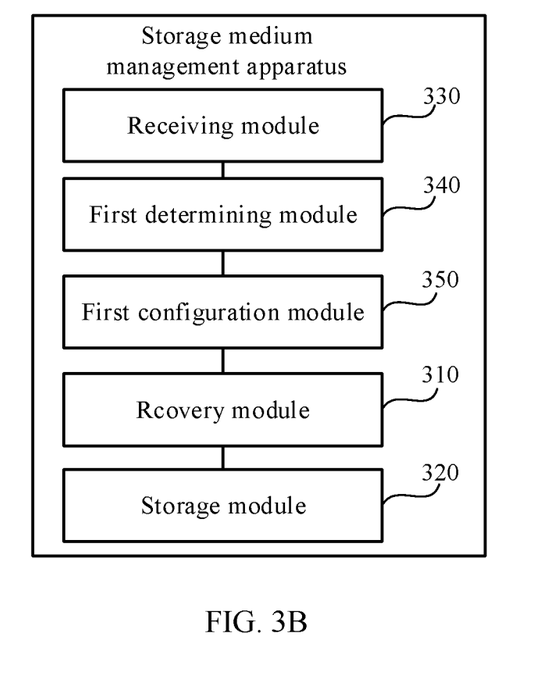
FIG. 3B shows a storage medium management apparatus according to another example embodiment.

Optionally, referring to FIG. 3B, the apparatus further includes a receiving module 330 configured to perform step 201 in the embodiment shown in FIG. 2, a first determining module 340 configured to perform step 202 in the embodiment shown in FIG. 2, and a first configuration module 350 configured to perform step 203 in the embodiment shown in FIG. 2.

Optionally, the first configuration module 350 is configured to determine a percentage of the capacity of the redundant space in a total capacity of the storage medium, obtain, by division from each component included in the storage medium, a physical storage unit in a size of the percentage, and determine all obtained physical storage units as the redundant space of the capacity.

Figure 3C:
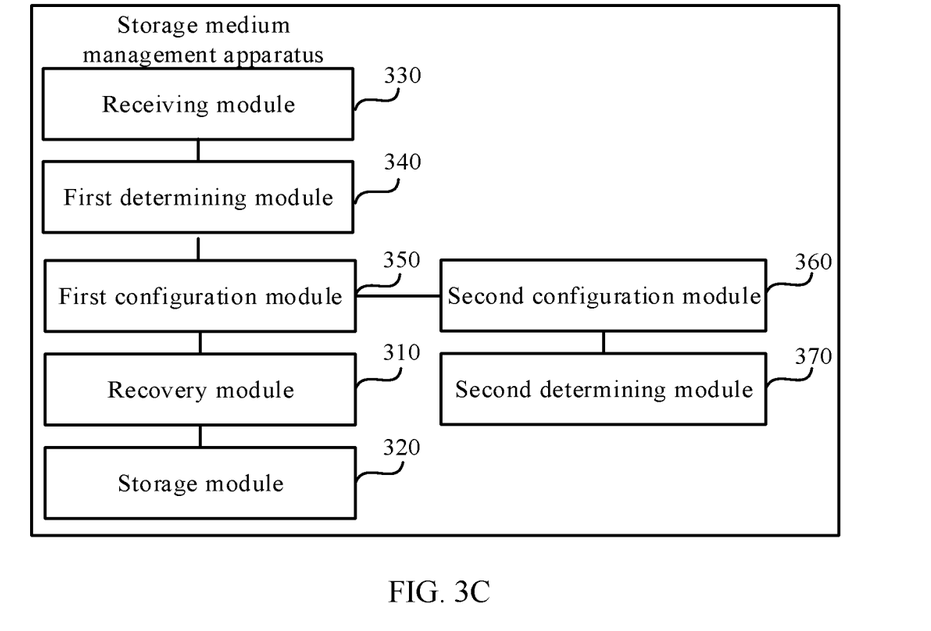
FIG. 3C shows a storage medium management apparatus according to another example embodiment.

Optionally, referring to FIG. 3C, the apparatus further includes a second configuration module 360 configured to reconfigure a RAID policy based on a remaining storage medium after the redundant space configuration, and a second determining module 370 configured to determine the reconfigured RAID policy as the specified RAID policy.

Figure 3D:
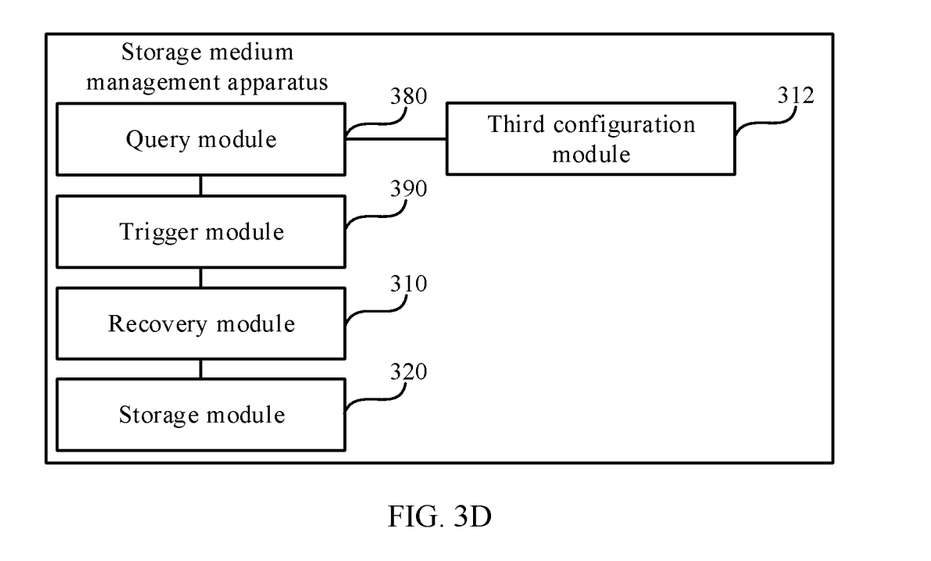
FIG. 3D shows a storage medium management apparatus according to another example embodiment.

Optionally, referring to FIG. 3D, the apparatus further includes a query module 380 configured to query whether a current remaining capacity of the redundant space is larger than or equal to a size of the data stored in the failed component, a trigger module 390 configured to, when the current remaining capacity of the redundant space is larger than or equal to the size of the data stored in the failed component, trigger the recovery module 310 to perform step 204 in the embodiment shown in FIG. 2, and a third configuration module 312 configured to, when the current remaining capacity of the redundant space is smaller than the size of the data stored in the failed component, determine a difference between the current remaining capacity of the redundant space and the size of the data stored in the failed component, and configure, from OP space of the storage system, a physical storage unit in a size of the difference as the redundant space.

In this embodiment of this application, the redundant space used to store data after failure recovery is fixedly preconfigured or is configured based on the maintenance-free rate, the maintenance-free period, the AFR of the storage medium, and the total quantity of components included in the storage medium. Therefore, even if a component in the storage medium fails, data in the failed component may be transferred to the redundant space for storage. In this way, a user does not need to manually replace the component, and maintenance-free management can be implemented on the storage medium using the redundant space, thereby improving management efficiency.

It should be noted that, when the storage medium management apparatus provided in the foregoing embodiment implements the storage medium management method, division of the foregoing function modules is only used as an example for description. In an embodiment, the functions may be allocated to different function modules for implementation based on a requirement. In an embodiment, an internal structure of a device is divided into different function modules to complete all or some functions described above. In addition, the storage medium management apparatus provided in the foregoing embodiment pertains to a same concept as the storage medium management method embodiment. For a specific implementation process of the storage medium management apparatus, refer to the method embodiment. Details are not described herein again.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD, a semiconductor medium (for example, a SSD), or the like.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A management method implemented by a storage system, wherein the management method comprises:
    obtaining a maintenance-free parameter;
    determining a capacity of an over-provisioning (OP) space of the storage system according to the maintenance-free parameter; and
    configuring the OP space with the capacity.

2. The management method of claim 1, further comprising further determining the capacity according to a disk parameter.

3. The management method of claim 2, wherein the disk parameter comprises at least one of an annualized failure rate (AFR) of the storage system or a quantity of disks comprised in the storage system.

4. The management method of claim 2, wherein after configuring the OP space, the management method further comprises reconfiguring a redundant array of independent disks (RAID) policy based on remaining disks that were not used to configure the OP space.

5. The management method of claim 1, wherein the maintenance-free parameter comprises at least one of a maintenance-free rate or a maintenance-free period.

6. The management method of claim 5, further comprising:
    receiving a configuration instruction; and
    obtaining the maintenance-free parameter from the configuration instruction.

7. The management method of claim 1, further comprising:
    determining disks used to configure the OP space;
    determining a disk capacity of each of the disks; and
    configuring the disk capacity of each of the disks used as the OP space.

8. A storage system, comprising:
    a memory configured to store programming instructions; and
    a processor coupled to the memory, wherein the programming instructions cause the processor to be configured to:
        obtain a maintenance-free parameter;
        determine a capacity of an over-provisioning (OP) space of the storage system according to the maintenance-free parameter; and
        configure the OP space with the capacity.

9. The storage system of claim 8, wherein the programming instructions further cause the processor to be configured to further determine the capacity according to the maintenance-free parameter and a disk parameter.

10. The storage system of claim 9, wherein the disk parameter comprises at least one of an annualized failure rate (AFR) of the storage system or a quantity of disks comprised in the storage system.

11. The storage system of claim 9, wherein after configuring the OP space, the programming instructions further cause the processor to be configured to reconfigure a redundant array of independent disks (RAID) policy based on remaining disks that were not used to configure the OP space.

12. The storage system of claim 8, wherein the maintenance-free parameter comprises at least one of a maintenance-free rate or a maintenance-free period.

13. The storage system of claim 12, wherein the programming instructions further cause the processor to be configured to:
receive a configuration instruction; and
obtain the maintenance-free parameter from the configuration instruction.

14. The storage system of claim 8, wherein the programming instructions further cause the processor to be configured to:
determine disks used to configure the OP space;
determine a disk capacity of each of the disks; and
configure the disk capacity of each of the disks as the OP space.

15. A computer program product comprising computer-executable instructions stored on a non-transitory computer-readable medium that, when executed by a processor, cause a storage system to:
obtain a maintenance-free parameter;
determine a capacity of an over-provisioning (OP) space of the storage system according to the maintenance-free parameter; and
configure the OP space with the capacity.

16. The computer program product of claim 15, wherein the instructions further cause the storage system to further determine the capacity according to the maintenance-free parameter and a disk parameter.

17. The computer program product of claim 16, wherein the disk parameter comprises at least one of an annualized failure rate (AFR) of the storage system or a quantity of disks comprised in the storage system.

18. The computer program product of claim 16, wherein after configuring the OP space, the instructions further cause the storage system to reconfigure a redundant array of independent disks (RAID) policy based on remaining disks that were not used to configure the OP space.

19. The computer program product of claim 15, wherein the maintenance-free parameter comprises at least one of a maintenance-free rate or a maintenance-free period.

20. The computer program product of claim 19, wherein the instructions further cause the storage system to:
receive a configuration instruction; and
obtain the maintenance-free parameter from the configuration instruction.

* * * * *